United States Patent
Braikevitch et al.

[15] 3,644,053
[45] Feb. 22, 1972

[54] WATER TURBINES

[72] Inventors: Michael Braikevitch; Emil Goldwag, both of Netherton, England

[73] Assignee: The English Electric Company, Limited, London, England

[22] Filed: July 17, 1970

[21] Appl. No.: 55,641

Related U.S. Application Data

[63] Continuation-in-part of Ser. No. 804,446, Mar. 5, 1969, abandoned.

[52] U.S. Cl....................................415/173, 290/52, 308/9, 415/112
[51] Int. Cl.......................F01d 15/10, F16c 7/04, F01d 5/20
[58] Field of Search................415/173, 172, 175, 142, 111, 415/112; 290/52–54; 417/356; 310/361; 308/9

[56] References Cited

UNITED STATES PATENTS

| | | | |
|---|---|---|---|
| 3,080,761 | 3/1963 | Speen | 308/9 |
| 3,191,079 | 6/1965 | Gitzendanner | 310/261 |
| 3,353,028 | 11/1967 | Braikevitch et al. | 290/52 |
| 3,422,275 | 1/1969 | Braikevitch et al. | 290/52 |
| 3,466,952 | 9/1969 | Greenbreg et al. | 308/9 |

*Primary Examiner*—Henry F. Raduazo
*Attorney*—Misegades & Douglas, Keith Misegades and George R. Douglas, Jr.

[57] ABSTRACT

An axial flow water turbine comprises a runner disposed for rotation in a water flow tube and carrying a peripheral drive member such as an electrical generator rotor. The runner is mounted on a stub shaft carried by an upstream supporting structure. The stub shaft is provided with discrete resiliently mounted bearing pads between which and the runner hydrostatic lubrication can be provided.

Preferably the stub shaft is hollow and each bearing pad is disposed in a recess formed in the stub shaft, the recess being provided with a detachable backing plate. Thus each pad can be withdrawn radially inwardly into the stub shaft and can be inspected or replaced without necessitating removal of the runner from the stub shaft.

8 Claims, 8 Drawing Figures

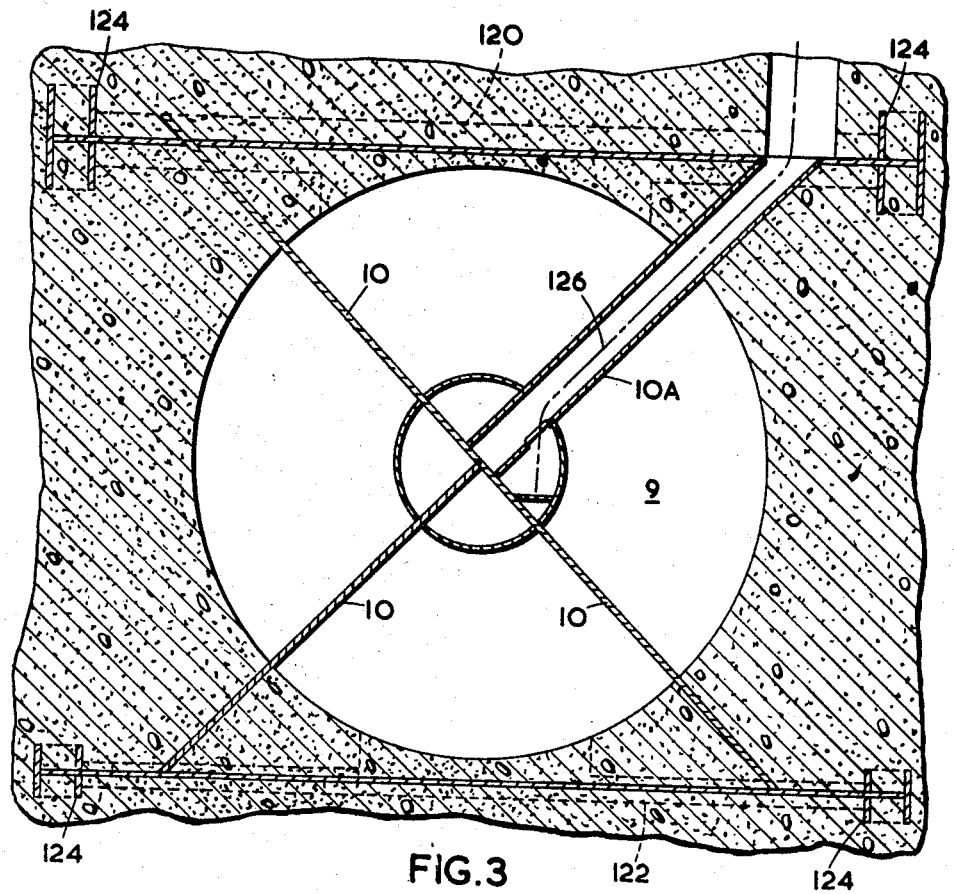
FIG.3
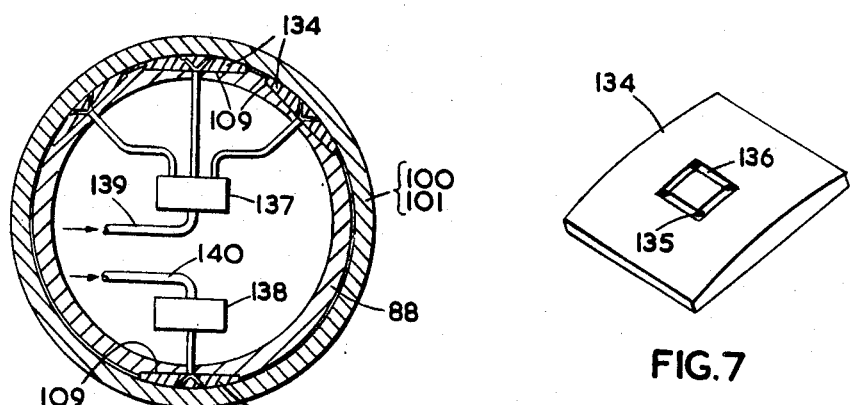
FIG.6
FIG.7

WATER TURBINES

This is a Continuation-in-Part of application Ser. No. 804,446, filed Mar. 5, 1969, now abandoned.

This invention relates to axial flow water turbines and pumps of the kind in which a turbine runner is disposed for operation in a water flow tube and arranged for rotation about an axis which is horizontal or substantially horizontal. Such turbines and pumps find application in, for example, tidal flow hydroelectric schemes.

In the past the runner of such a turbine has been supported for rotation on a rotatable shaft carried in fixed bearings spaced axially apart, the shaft and runner being secured together for rotation together, and the bearings being carried by supporting structures mounted within the tube. In one simple arrangement the bearings and associated supporting structures have been mounted on either side of the runner, but this arrangement has the attendant disadvantage with some types of axial flow turbine that bearing support structures located downstream of the runner produce difficult hydraulic flow problems. In particular, with a runner having fixed blades or vanes operating with a variable load and/or from a variable head water supply source, the exit water from the runner has in general a circumferential motion of magnitude dependent on the operating load and head, so that for most values of operating load and head severe and variable circumferential loading is placed on any fixed bearing structure which is located downstream. Furthermore, such a downstream bearing structure produces extra turbulence in the water flow in the draft tube.

Thus for hydraulic flow reasons it is desirable to have the bearing supporting structures mounted upstream of the runner in the tube, and such arrangements have been proposed in the past.

It has also been proposed to mount a generator rotor or other heavy peripheral drive member directly around the runner of an axial flow turbine so as to be carried by the runner and so obviate the need for a shaft to transmit the runner torque to a generator or other load device.

However, since such a generator rotor may, as now envisaged, have a diameter of the order of 20 to 30 feet and a weight of some hundreds of tons, great difficulties arise in supporting the runner and generator rotor if the shaft and bearing arrangements of the prior art are adopted. Moreover, where a generator rotor is carried directly by the runner the bearing arrangements for supporting the runner must also be able to resist any unbalanced magnetic pull which is exerted on the rotor of the generator.

According to the present invention an axial water flow machine includes:
 a water flow tube;
 a runner disposed within the tube for rotation about a substantially horizontal axis and adapted to carry a peripheral drive member; and
 a supporting structure disposed axially to one side of the runner for supporting the runner within the tube;
 wherein the improvement comprises the provision of:
 a stub shaft extending from the supporting structure and engaging a bore defined in the runner radially within the said peripheral drive member; and
 a plurality of bearing pads carried by the stub shaft to which pads a lubricant can be fed under pressure to provide hydrostatic lubrication between each pad and the bore, each pad being resiliently mounted radially with respect to the stub shaft.

As compared with the prior art arrangement recited above in which a turbine runner is carried on a rotatable shaft which is itself carried in two fixed bearings mounted upstream of the runner, the bearing arrangement of a turbine according to the present invention is positioned relative to the runner so that the load it has to carry, for given runner forces, is substantially less than that which the bearing adjacent the runner in the recited prior art arrangement would have to carry for the same forces acting on the turbine runner.

Furthermore, since the bearing arrangement has been placed at a position where the load it has to support is least, the higher loads to be carried in supporting the stub shaft in a cantilever manner can be carried more satisfactorily in the static support structure that has to be provided for the boss. This obviates the problem of carrying such higher loads on the relatively movable surfaces of a bearing adjacent but upstream of the runner such as would be encountered in the above-recited prior art arrangement.

By obviating the rotating shaft and its two axially spaced fixed bearings of the recited prior art arrangement the bearing clearances present in the system have been reduced to those attendant upon the use of a single bearing arrangement, instead of those associated with two bearings, so that the alignment of the runner can be generally more accurate and subject to smaller changes under load conditions.

Preferably recesses are formed in the stub shaft and a bearing pad is disposed in each recess. Each recess may be provided with a backing plate and each bearing pad is located circumferentially and axially by the recess and is supported radially by a plurality of compression springs which bear against the said backing plate.

Preferably also each backing plate is detachable and the stub shaft is hollow such that each bearing pad can be withdrawn radially inwardly into the stub shaft.

The bearing pads may be spaced circumferentially around the stub shaft, the circumferential spacing between adjacent pads being greater on the underside of the shaft than on the upper side. Alternatively or additionally the bearing pads on the underside of the stub shaft are each of smaller bearing area than those on the upper side.

There may be two axially spaced circumferentially extending sets of bearing pads on the stub shaft.

Secured to the stub shaft may be an annular bearing flange which extends substantially radially therefrom and cooperates with the runner for transmitting axial thrust from the runner to the supporting structure, the flange incorporating in its surface a plurality of bearing pads between which and the runner hydrostatic lubrication can be provided.

One axial flow water turbine and a modification thereof, with a peripheral drive member in the form of a rim-mounted electrical generator rotor, according to the present invention, will now be described by way of example and with reference to the accompanying drawings, in which:

FIG. 3 shows a section taken on the line III—III in FIG. 1;

FIG. 6 shows a section through a modified bearing arrangement for supporting the turbine runner, transverse to the axis of rotation of the runner;

FIG. 7 shows a perspective view of one bearing pad as incorporated in the bearing arrangement shown in FIG. 6.

Figure 1:
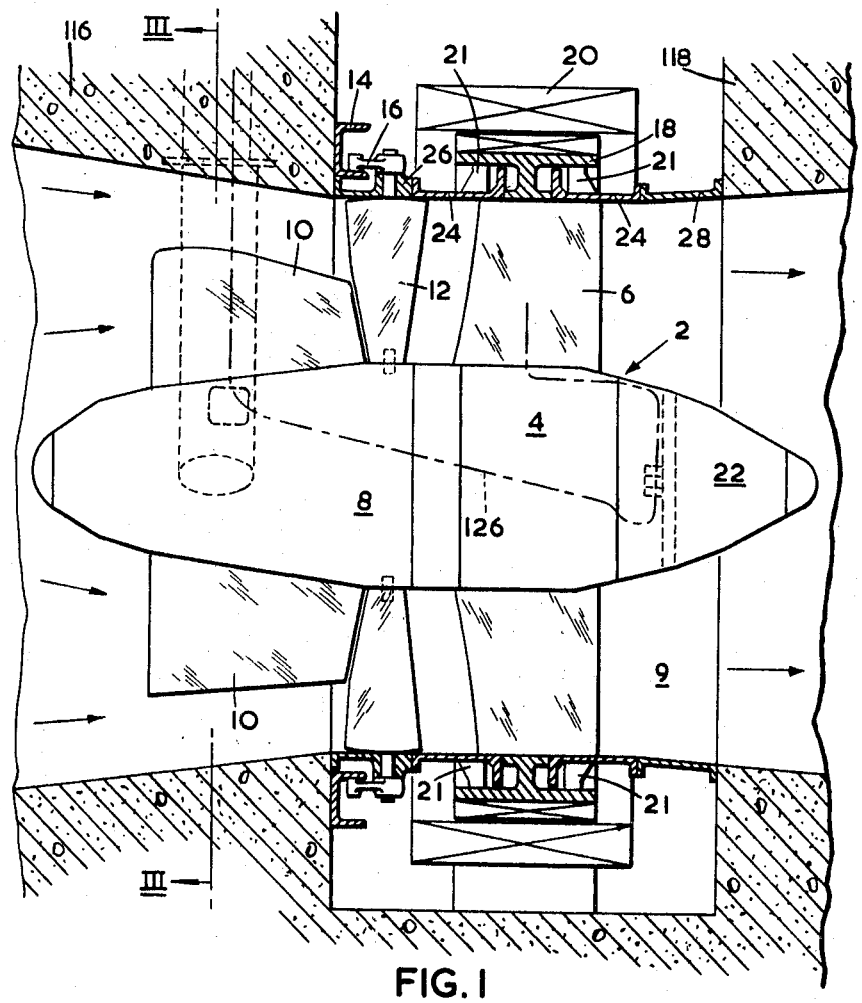
FIG. 1 shows diagrammatically the general arrangement of the turbine and generator, seen from the side with some parts shown in section.

Referring now to FIG. 1, the turbine consists of a runner 2 including a hub assembly 4 with four blades 6. The hub is mounted on a bearing arrangement (shown particularly in FIG. 2) which is carried in an overhung fashion from a stationary nacelle 8 which is itself carried centrally within a water flow tube 9 by four vanes 10. Upstream of the runner there are a number of adjustable control blades 12 which are adjustably pivoted about radial axes, the angle of inclination of all the blades 12 being varied by rotating a control ring 14 about the axis of the turbine. The ring 14 is pivotally connected to crank arms 16 on the outer trunnions of the blades 12.

The turbine drives a generator consisting of a peripheral drive member in the form of a rotor 18 secured directly around the turbine runner, and a stator 20 surrounding the rotor. It will be seen that the rotor 18 lies outside the bore of the tube 9 containing the turbine runner, so as not to obstruct flow through the tube.

A nose cone 22 is secured to the hub assembly 4 to provide streamlining downstream of the runner.

Two annular seals 12 acting between the rotor 18 and two removable tubular parts 24 disposed on opposite sides of the rotor (and defining part of the turbine tube) limit the escape of water under pressure from the turbine tube between the adjacent parts of the rotor 18 and tubular parts 24. The seals are shown in outline in FIG. 1, and diagrammatically in FIG. 2. The detail of the seals will not be described here since the present invention is not concerned with them. For details of the construction of the seals, the reader's attention is directed to the applicants' other application, Ser. No. 804,438 filed Mar. 5, 1969.

The removable tubular parts 24 of the turbine tube have flanges 25 (see FIG. 2) bolted upstream to an annular part 26 and downstream to an annular part 28 respectively, each such part further defining the turbine tube 9. The end of each tubular part 24 adjacent to the generator rotor is formed with an outwardly extending flange 30 which lies closely adjacent an annular plate 72 secured to the body.

The body portion 32 of the generator rotor is formed with recesses 68 for the sake of lightness. Each recess 68 extends circumferentially until just short of a runner blade, so that the rotor body portion 32 is solid in the region lying immediately outside each runner blade. The rotor is secured to the runner blades by fasteners 70 (see FIG. 2) of which only one is shown. The cover plates 72 extend over the recesses 68. The flanges 30 of the tubular members 24 have recesses which contain circumferentially extending inflatable tubes 74 which can be expanded by internal fluid pressure to seal against the plates 72 and thereby isolate the seals 21 completely from water in the turbine tube 9. This is done when the turbine is stationary and when the seals are to be inspected.

Figure 5:
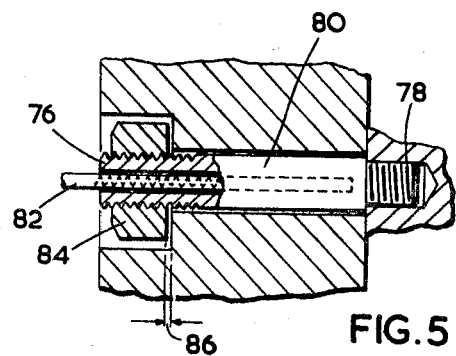
FIG. 5 shows in section the detail of one fastening device for securing the generator rotor to the turbine runner.

FIG. 5 shows one of the fasteners securing the generator rotor to the runner blades. Each fastener consists of a stud 76 having a threaded end portion 78 which is screwed into the end of the runner blade. The body 80 of the stud passes through a clearance hole in the rotor and has a central bore into which an electric heating element 82 is inserted during assembly. Before the current is switched on, a nut 84 is tightened on to the outer end of the stud. Heating of the stud by means of the electric element then expands the stud longitudinally, and when the required expansion has been obtained, as indicated for example by the clearance 86 which then exists between the nut 84 and the cooperating face of the rotor, the nut 84 is again tightened. As a result, when the stud cools down it is put into tension. This pretensioning of the studs is desirable in order to prevent the generator rotor from expanding through centrifugal force to a point at which it parts from the tips of the runner blades. The prestressing should be such as to prevent such parting during normal running, and preferably also in the event of overspeed running, this is to say in an emergency.

This method of securing the generator rotor to the runner is especially applicable to large runners, say of the order of 30 feet in diameter.

Other methods of pretensioning the fasteners may be used. For example, the nut 84 may be tightened to a predetermined extent in order to place the stud 80 in the desired amount of tension without the use of heating.

There may be, for example, seven or eight studs for each blade, evenly spaced along the edge of the blade.

Figure 2:
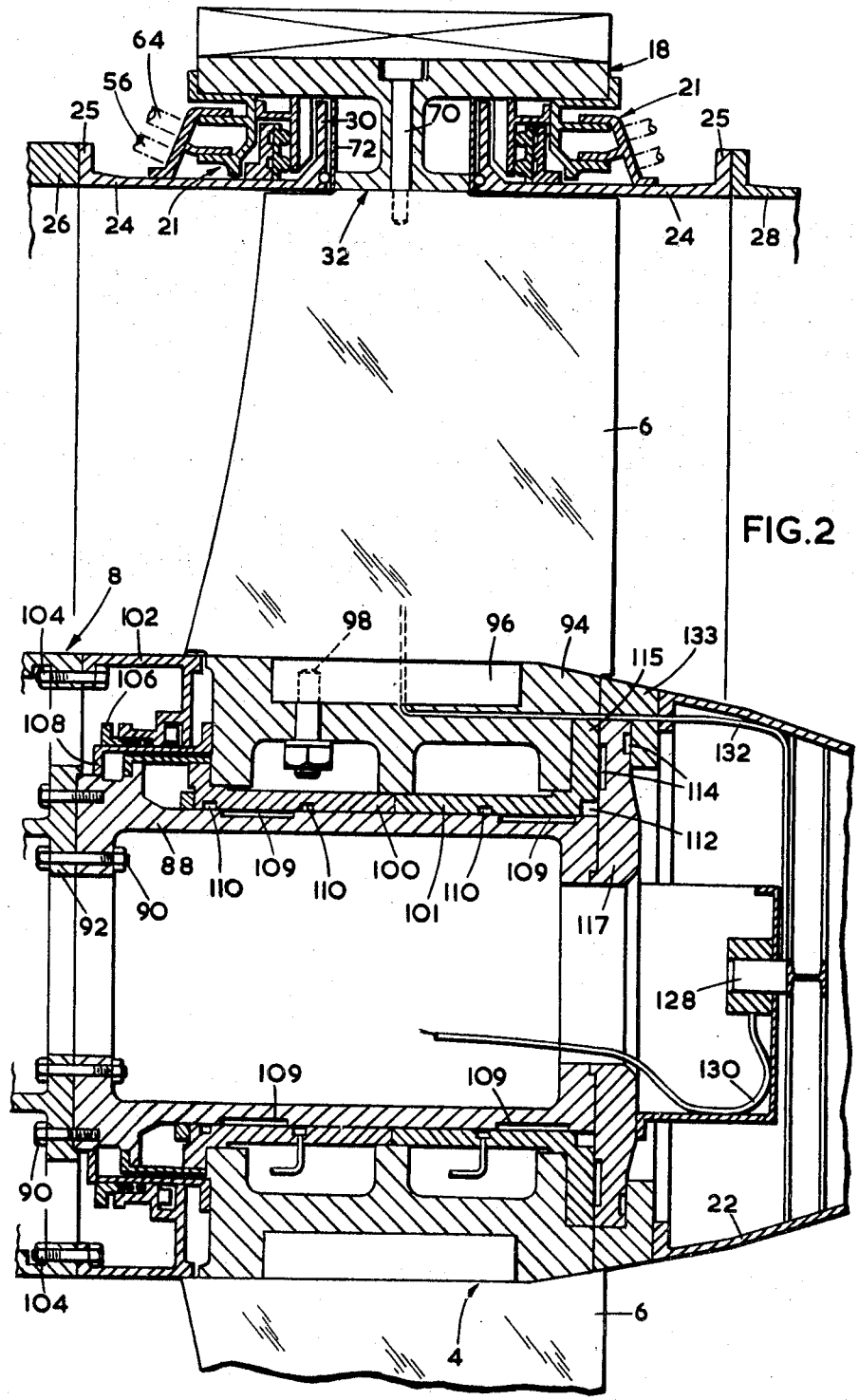
FIG. 2 shows an enlarged view of part of the turbine and generator as seen in FIG. 1, showing in detail the bearing arrangement supporting the turbine runner.
Figure 4:
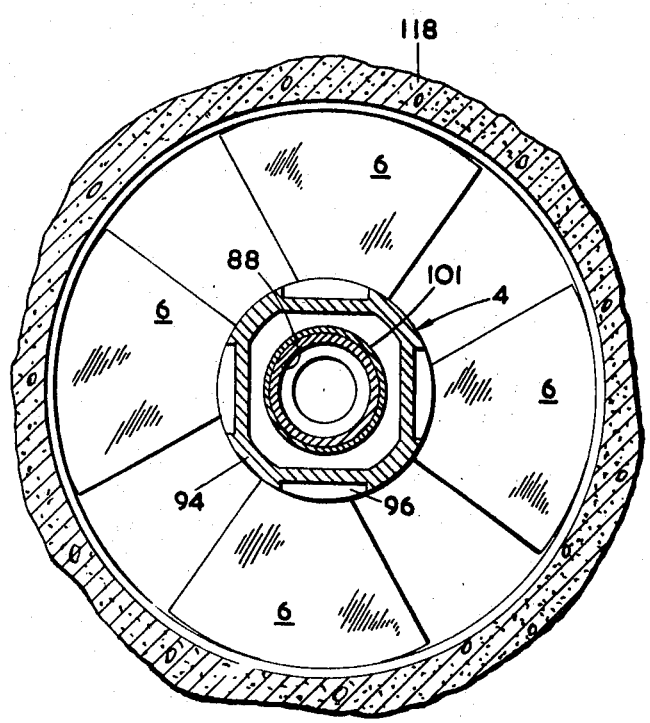
FIG. 4 shows a partly sectioned diagrammatic view of the turbine looking upstream.

FIG. 2 shows how the turbine runner is borne by the nacelle 8. A cylindrical stub shaft 88 is secured by bolts 90 to an inwardly directed flange 92 disposed at the downstream end of the nacelle 8, and the runner hub itself surrounds this boss. The hub consists basically of an annular part 94 which has recesses in which root portions 96 of the blades are secured by bolts 98 (of which only one is shown for the sake of clarity). Within the part 94 there are two cylindrical liner members 100 and 101 whose internal cylindrical surfaces constitute the internal bearing surface of the hub. A further annular part 102 which cooperates with the upstream end of the hub is secured to the nacelle by bolts 104, and has a water seal formed by a gland 106 engaging between the part 102 and a rotary part 108 secured to the annular part 94 of the runner.

It should be noted that this single bearing arrangement for supporting the runner and the generator rotor lies substantially symmetrical within the runner and rotor. In other words, the center of gravity of the runner and rotor lies substantially centrally within the bearing arrangement.

The stub shaft 88 has a cylindrical external bearing surface in which are formed two axially spaced sets of circumferentially spaced pockets 109 into which high-pressure oil is fed via constriction orifices (not shown) to support the runner in the manner of a hydrostatic bearing. In other words, the oil pressure supplied is sufficient to lift the liner members slightly from the boss and to maintain a slight running clearance between them and the boss. Though the pockets 109 are positioned all the way around the hub, they are more widely spaced around the bottom part of the hub. Oil escaping axially from the pockets 109 is bled away through passageways (not shown) extending from complete circumferential grooves 110 in the liner members, except that oil escaping from the downstream pockets 109 is extracted from a circumferential recess 112.

This recess 112 isolates the adjacent pockets 109 from pockets 114 formed in a thrust bearing flange 117 which is secured to the downstream end of the stationary boss 88 and which cooperates on the upstream side thereof with an outwardly extending flange 115 of the downstream liner member 101 and on the downstream inside thereof with a runner-retaining member 133 which is secured to the annular part 94 of the hub.

As will be seen from FIG. 2 the stationary thrust bearing flange 117 has two sets of pockets 114 formed in the opposite surfaces thereof. These two sets of pockets 114 are supplied with lubricating oil through separate constriction devices so that the thrust-bearing arrangement operates in the manner of a hydrostatic bearing to control the axial position of the turbine runner.

Though the pockets 109 and 114 have been described and shown as being formed in the stationary parts of the bearing arrangements, they could if desired be formed in the associated moving parts.

In a preferred modification of the bearing arrangements described above each of the pockets 109 and 114 has disposed within it a bearing pad whose bearing surface is raised above the level of the surface into which the pad is inserted, so that the stationary bearing surfaces are constituted solely by the bearing surfaces presented by the pads to the moving surfaces of the runner.

Openings formed centrally in each of the pads provide passages enabling lubricating oil supplied to the pockets as described above to issue between the stationary and moving bearing surfaces. In the FIGS. 6 and 7, the pockets 109 in the stub shaft 88 are occupied by bearing pads 134 having central openings 135 which open into the corners of square-shaped grooves 136.

Since the bearing surfaces of the pads in the pockets 109 carry the runner, the stub shaft 88 need not have a cylindrical shape, but merely a shape suited to supporting the bearing pads in the desired positions. Furthermore, the area of the bearing pad surfaces may be made to suit the magnitude of the runner load and forces only, and need not be suited to the size of boss which is necessary to give the runner adequate positional stability under all conditions of water head and load. This provides the advantage that the bearing frictional losses are kept to a minimum, and are not determined by a bearing shaft size designed to give the desired positional stability of the runner.

As compared with the bearing arrangement described with reference to the FIG. 2 in which the hub and boss have complementary internal and external cylindrical bearing surfaces with oil admitted to the pockets 109, the modified arrangement of FIGS. 6 and 7 using pads in the pockets provides an arrangement in which the rate of flow of lubricating oil through the bearing is lower for the same oil pressure. This economizes in the horsepower required to circulate the bearing oil against the bearing film pressure.

In a preferred form of bearing as illustrated in FIG. 6, the runner hub liners 100, 101 are supported on two axially spaced sets of bearing pads 134 carried in pockets 109, and each set comprises three upper pads distributed symmetrically over the crown of the stub shaft 88 and a single lower pad, all positioned as shown in FIG. 6.

In each set the three upper pads are designed to carry the runner load and forces, together with the downward force exerted on the hub by the lower pad, while the lower pad is designed to provide a mechanism for automatically maintaining the oil film thickness on the three upper pads substantially constant regardless of runner operating conditions. To this end the flow of oil to the upper and lower pads is regulated automatically by separate constriction devices 137, 138 connected in the oil supply pipes 139, 140 feeding the upper and lower pads respectively.

Hence in each set of pads a reduction in the thickness of the oil film on the upper pads due to an increase in runner forces results in a simultaneous increase in the thickness of oil film on the lower pad, and a consequent increased flow of oil and reduction of oil pressure supplied to the lower pad. This reduction of oil pressure on the lower pad reduces the downward force exerted by the lower pad on the runner hub, so that the downward force exerted by the runner hub on the upper pads decreases, thus allowing the oil film on the upper pads to increase.

It will be appreciated that in the bearing arrangements described the load carried by the upper bearing pads includes a contribution due to the downward force exerted on the rotor hub by the lower pads. Hence the preferred arrangement of FIG. 6 provides an advantageous arrangement, in that the downward force exerted on the hub by the lower bearing pad array is kept to a low value (there being only one lower pad), and reduces the size of the bearing pads to be provided on the upper side of the boss, and of the hoop stresses in the runner hub.

Though in the above description the bearing surfaces have been provided on pads located in the pockets 109 and 114, such bearing surfaces could be provided on raised portions of the cylindrical boss 88 and of the thrust-bearing flange 117. However, the use of separate pads represents a much more economical form of construction.

Figure 8:
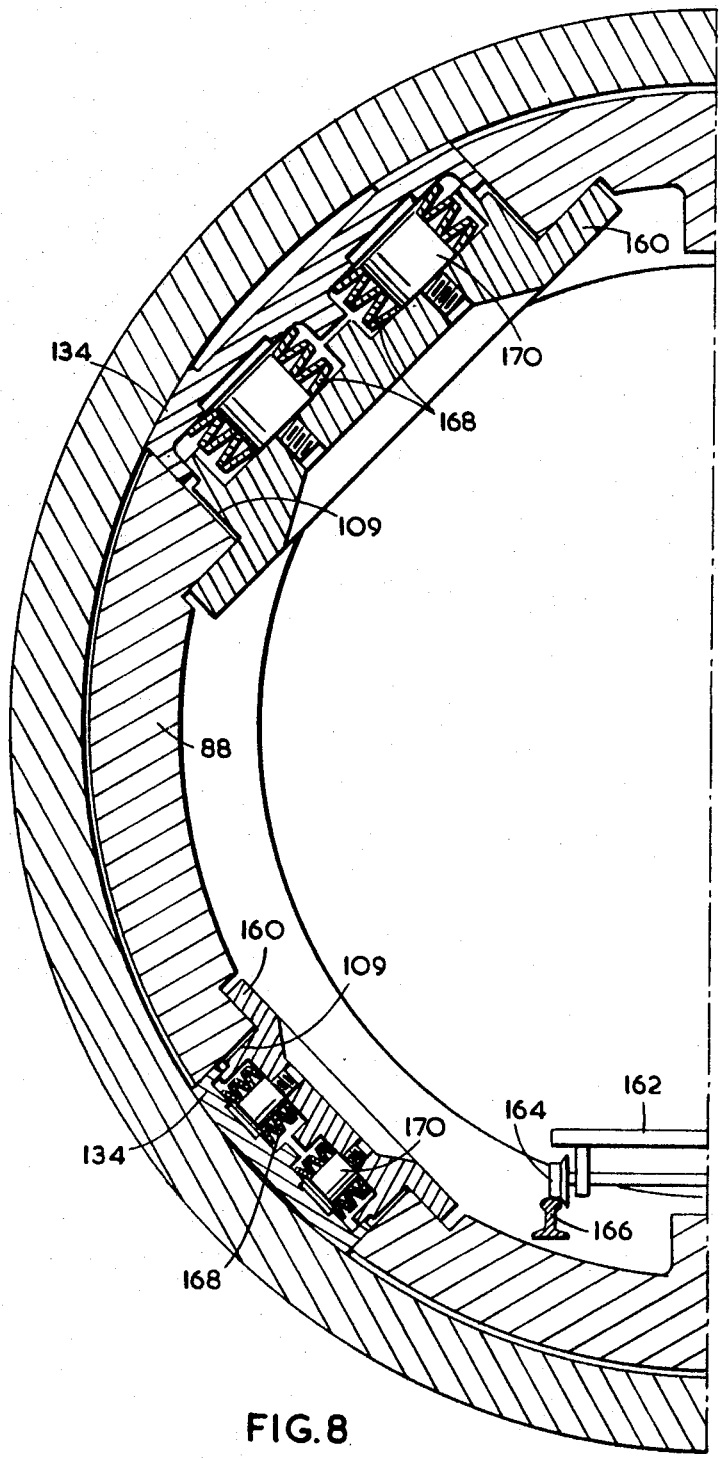
FIG. 8 shows a half section similar to FIG. 6 but on a larger scale and illustrates another bearing arrangement.

Referring to FIG. 8, in which like parts bear identical references to those used in the earlier figures, there is shown a preferred form of bearing in accordance with the invention in which bearing pads 134 are located axially and circumferentially in recesses or pockets 109 formed in the surface of a stub shaft 88. The floor of each recess 109 is formed by a backing plate 160 which is bolted to a spot-face machined on the inner surface of the stub shaft 88. Removal of the bolts (not shown) allows the backing plate 160 and the bearing pad 134 to be withdrawn radially inwardly from the surface of the shaft for maintenance or replacement. A trolley 162 having flanged wheels 164 which run on rails 166 is provided within the shaft for movement of backing plates and bearing pads between the runner and an access point in the supporting structure 8, 10 (see FIG. 1). By virtue of this arrangement a bearing pad can be replaced without the need to remove the runner from the stub shaft 88.

Each bearing pad 134 is a sliding radial fit between the walls of its recess 109. With the backing plate 160 bolted in place the pad 134 is urged radially outward by four stacks of conical spring washers 168 (of which only two are shown in FIG. 8). Each stack of washers is located by a stud 170 screwed into the backing plate. Lubricating oil is supplied under pressure to each bearing pad 134 in a similar manner to the arrangement shown in FIGS. 6 and 7. A flexible portion (not shown) is however introduced into each supply pipe 139, 140 (FIG. 6) where it communicates with the pad 134 in order to accommodate radial movement experienced by the pad as a result of its resilient mounting.

The resilient mounting of the bearing pads 134 has application to bearing arrangements of any size, but it will be appreciated that with a machine of such size as has been described above the resilience will be of especial advantage in accommodating small machining inaccuracies as well as strains caused by the dead weight of the runner and by centrifugal forces.

It will be seen that in the bearing arrangement shown in FIG. 8 there is a set of four circumferentially spaced bearing pads 134 (only two being shown since FIG. 8 is a half section), the lower pads being smaller in bearing area than the upper pads. This represents a slightly different method of achieving the effect sought by the arrangement shown in FIG. 6 in which the lower pads are reduced in number rather than in bearing area.

The forms of bearing described above facilitate the overhung mounting of the runner. Overhanging of the runner is an advantage because of the omission of downstream support vanes which necessarily give rise to losses.

It should be noted that the axial extent of the turbine hub assembly extending from the left-hand end of the stub shaft 88 to the left-hand end of the nose cone 22 is less than the distance between the end flanges 25 of the tube portions 24. The arrangement is such that the entire turbine runner and generator rotor, together with the tube portions 24, can be withdrawn vertically or laterally for servicing, after first removing the end cone 22, disconnecting the stub shaft 88 and annular part 102 from the nacelle (by withdrawing the bolts 90 and 104), and disconnecting the flanges 25 of the tube portions 24 from their cooperating attachment points. The flanges 25 may for example be bolted to corresponding flanges on further tubular parts forming liners within the concrete surrounds 116 and 118. This arrangement enables the runner and generator rotor and also the generator stator to be readily serviced; while this servicing is being carried out a replacement set may be inserted so that the turbine set can continue to operate.

It should be noted, as shown in FIG. 3, that the vanes 10 carrying the nacelle 8 are set at 45° to the horizontal. This enables their outer ends to be anchored close to the ends of two horizontal beams 120 and 122 lying respectively above and below the water tube, which beams are connected to four sole plates 124 built into concrete walls extending axially from upstream to downstream of the runner, past the generator stator 20, to the foundations surrounding the turbine tube downstream of the runner. This arrangement is particularly useful where there is a desire not to have the thrust on the runner felt as a pull on the dam construction upstream of the runner.

One of the vanes identified as 10A in FIG. 3 is hollow and has a streamline cross section (apparent from FIG. 1), to provide an access to point to the nacelle and hub whereby to enable inspection of the various parts to be carried out.

Electrical leads for connection to the generator rotor pass through the hollow vane 10A and along a path indicated approximately by the chain-dotted line 126 (see especially FIG. 1), a slipring assembly 128 being provided in the nose cone to enable electrical connection between a stationary supply cable 130 (shown in FIG. 2) and a cable 132 disposed in one of the runner blades 6 for supplying the generator rotor windings.

The lower bearing pad shown in FIG. 6 may be omitted in some instances provided that rubbing rings are fitted around the lower part of the stub shaft to prevent damage of the internal bearing surface of the runner hub in the unexpected event that the runner is subjected to a sudden high side thrust. The lower bearing pad shown in FIG. 6 provides an automatic stabilizing action to maintain the runner rotating about its desired axis when such side thrusts occur, and so prevent damage of the runner bearing surface.

We claim:

1. An axial water flow machine including:
   a water flow tube;
   a runner disposed within the tube for rotation about a substantially horizontal axis and adapted to carry a peripheral drive member;
   a supporting structure disposed axially to one side of the runner for supporting the runner within the tube;
   wherein the improvement comprises the provision of:
   a stub shaft extending from the supporting structure and engaging a bore defined in the runner radially within the said peripheral drive member;
   a plurality of bearing pads carried by the stub shaft, means whereby a lubricant can be fed under pressure to provide hydrostatic lubrication between each pad and the bore, and means whereby each pad is resiliently mounted radially with respect to the stub shaft.

2. A machine according to claim 1, wherein recesses are formed in the stub shaft and a bearing pad is disposed in each recess.

3. A machine according to claim 2, wherein each recess is provided with a backing plate and each bearing pad is located circumferentially and axially by the recess and is supported radially by a plurality of compression springs which bear against the said backing plate.

4. A machine according to claim 3, wherein each backing plate is detachable and the stub shaft is hollow such that each bearing pad can be withdrawn radially inwardly into the stub shaft.

5. A machine according to claim 1, wherein the bearing pads are spaced circumferentially around the stub shaft the circumferential spacing between adjacent pads being greater on the underside of the shaft than on the upper side.

6. A machine according to claim 1, wherein the bearing pads on the underside of the stub shaft are each of smaller bearing area than those on the upper side.

7. A machine according to claim 1, wherein there are two axially spaced, circumferentially extending sets of bearing pads on the stub shaft.

8. A machine according to claim 1, wherein secured to the stub shaft is an annular bearing flange which extends substantially radially therefrom and cooperates with the runner for transmitting axial thrust from the runner to the supporting structure, the flange incorporating in its surface a plurality of bearing pads between which and the runner hydrostatic lubrication can be provided.

* * * * *